United States Patent
Kahn et al.

(10) Patent No.: US 9,922,186 B1
(45) Date of Patent: Mar. 20, 2018

(54) WEARABLE DEVICE FOR IMPROVED SAFETY

(71) Applicants: Philippe Richard Kahn, Santa Cruz, CA (US); Arthur Kinsolving, Santa Cruz, CA (US); Mark Andrew Christensen, Santa Cruz, CA (US); Sonia Lee Kahn, Santa Cruz, CA (US)

(72) Inventors: Philippe Richard Kahn, Santa Cruz, CA (US); Arthur Kinsolving, Santa Cruz, CA (US); Mark Andrew Christensen, Santa Cruz, CA (US); Sonia Lee Kahn, Santa Cruz, CA (US)

(73) Assignee: DP Technologies, Inc., Scotts Valley, CA (US)

(*) Notice: Subject to any disclaimer, the term of this patent is extended or adjusted under 35 U.S.C. 154(b) by 0 days.

(21) Appl. No.: 15/085,699

(22) Filed: Mar. 30, 2016

Related U.S. Application Data

(60) Provisional application No. 62/140,448, filed on Mar. 30, 2015.

(51) Int. Cl.

| | |
|---|---|
| *G06F 21/31* | (2013.01) |
| *H04L 9/32* | (2006.01) |
| *H04W 12/08* | (2009.01) |
| *H04L 29/06* | (2006.01) |
| *G06F 21/00* | (2013.01) |
| *H04B 5/02* | (2006.01) |
| *H04L 12/28* | (2006.01) |
| *G06F 21/34* | (2013.01) |

(52) U.S. Cl.
CPC .................................. *G06F 21/34* (2013.01)

(58) Field of Classification Search
CPC ........... G06F 21/31; H04L 9/32; H04L 29/06; H04W 12/08
USPC .............. 726/20; 455/41.1; 340/5.1; 713/186
See application file for complete search history.

(56) References Cited

U.S. PATENT DOCUMENTS

| | | | | |
|---|---|---|---|---|
| 8,904,186 | B2 * | 12/2014 | Smith ...................... | G06F 21/34 |
| | | | | 713/185 |
| 9,400,977 | B2 * | 7/2016 | Brown ................ | G06Q 20/3227 |
| 9,569,625 | B2 * | 2/2017 | DiBona ................... | G06F 21/60 |
| 9,684,778 | B2 * | 6/2017 | Tharappel ............... | G06F 21/32 |
| 2009/0322513 | A1 * | 12/2009 | Hwang .............. | A61B 5/02055 |
| | | | | 340/539.12 |
| 2014/0089672 | A1 * | 3/2014 | Luna ..................... | H04L 9/3231 |
| | | | | 713/186 |
| 2014/0101755 | A1 * | 4/2014 | Tang ....................... | G06F 21/35 |
| | | | | 726/20 |
| 2014/0172727 | A1 * | 6/2014 | Abhyanker ........ | G06Q 30/0645 |
| | | | | 705/307 |

(Continued)

*Primary Examiner* — Nam V Nguyen
(74) *Attorney, Agent, or Firm* — HIPLegal LLP; Judith Szepesi

(57) ABSTRACT

A method of providing an additional safety mechanism comprising enabling a setting up of a transaction using a mobile device, between a recipient and a provider, the transaction to be completed face-to-face, providing a wearable device, capable of connecting to the mobile device of the recipient and the mobile device of the provider, the wearable device used to identify an owner of the wearable device as the indicated provider. The method further comprising using the connection between the wearable device and the recipient mobile device to provide an authentication of the recipient to the provider.

20 Claims, 9 Drawing Sheets

(56) References Cited

U.S. PATENT DOCUMENTS

| | | | |
|---|---|---|---|
| 2014/0279528 A1* | 9/2014 | Slaby | H04L 63/0853 |
| | | | 705/44 |
| 2014/0329497 A1* | 11/2014 | Sanzgiri | H04W 12/06 |
| | | | 455/411 |
| 2015/0135284 A1* | 5/2015 | Bogard | H04L 63/107 |
| | | | 726/5 |
| 2015/0245164 A1* | 8/2015 | Merrill | H04W 4/06 |
| | | | 370/329 |
| 2015/0287256 A1* | 10/2015 | Davis | G05B 19/02 |
| | | | 340/5.25 |
| 2015/0294303 A1* | 10/2015 | Hanson | G06Q 20/346 |
| | | | 235/379 |
| 2016/0037346 A1* | 2/2016 | Boettcher | H04M 1/72519 |
| | | | 455/411 |
| 2016/0150350 A1* | 5/2016 | Ingale | H04L 67/12 |
| | | | 370/255 |

* cited by examiner

| Code | Action |
|---|---|
| Push and Hold | Panic Button: Alert service |
| Short-Short-Short | Passenger has weapon: Alert service & law enforcement |
| Short-Long-Short | Passenger threatening: Alert service |
| Long-Short-Long | Carjacking: Alert service & law enforcement |
| User Defined | User Defined |

Fig. 6

WEARABLE DEVICE FOR IMPROVED SAFETY

RELATED APPLICATION

The present application claims priority to U.S. Provisional Application No. 62/140,448, filed on Mar. 30, 2015, and incorporates that application by reference in its entirety.

FIELD

The present invention relates to wearable devices, and more particularly to using wearable devices in improving safety.

BACKGROUND

A variety of systems enable a buyer and seller, or service provider and service recipient to set up an exchange over their mobile devices, and then set up an in-person interaction. However, verifying that the individual who set up the exchange and the individual who meets in person is the same person is not trivial, and there may be significant risk in having the wrong person appear.

One type of system that relies on such a set-up is a taxi-type ride application, which enables a passenger to call a driver, to be picked up and taken to a designated location. The actual drivers and passengers are screened by the providers of the system. However, if a "fake" driver or passenger shows up, the risk is considerable, ranging from carjacking to rape, to other dangers.

BRIEF DESCRIPTION OF THE FIGURES

The present invention is illustrated by way of example, and not by way of limitation, in the figures of the accompanying drawings and in which like reference numerals refer to similar elements and in which:

FIG. 6 is a table illustrating some potential panic codes and the associated response.

DETAILED DESCRIPTION

The system includes a wearable device which is paired with a mobile device, the wearable device designed to provide an additional layer of safety, for an interaction between a service provider and a service recipient, buyer and seller, or another pair (or more) persons who initially set up an agreement using their computers (which may be mobile devices), and then meet in person. In one embodiment, the wearable device is a pod, wrist-worn device, clip-on or otherwise body-worn device which synchronizes with a mobile device. The wearable device is generally worn by the seller/service provider, as a single seller/service provider is much more likely to interact with a lot of buyers/service recipients than vice versa. However, it should be understood that the buyer/service recipient may also utilize a wearable device, and in one embodiment, such authentication and other functions may be provided to both parties.

One exemplary service provider/service recipient pairing may be a driver and a passenger. For simplicity, the below discussion references the two parties as driver and passenger, or provider and recipient. However, it should be understood to cover any service provider/recipient, buyer/seller, or other arrangement between two or more people where the initial contact is arranged via computer, and subsequently the people meet in person.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
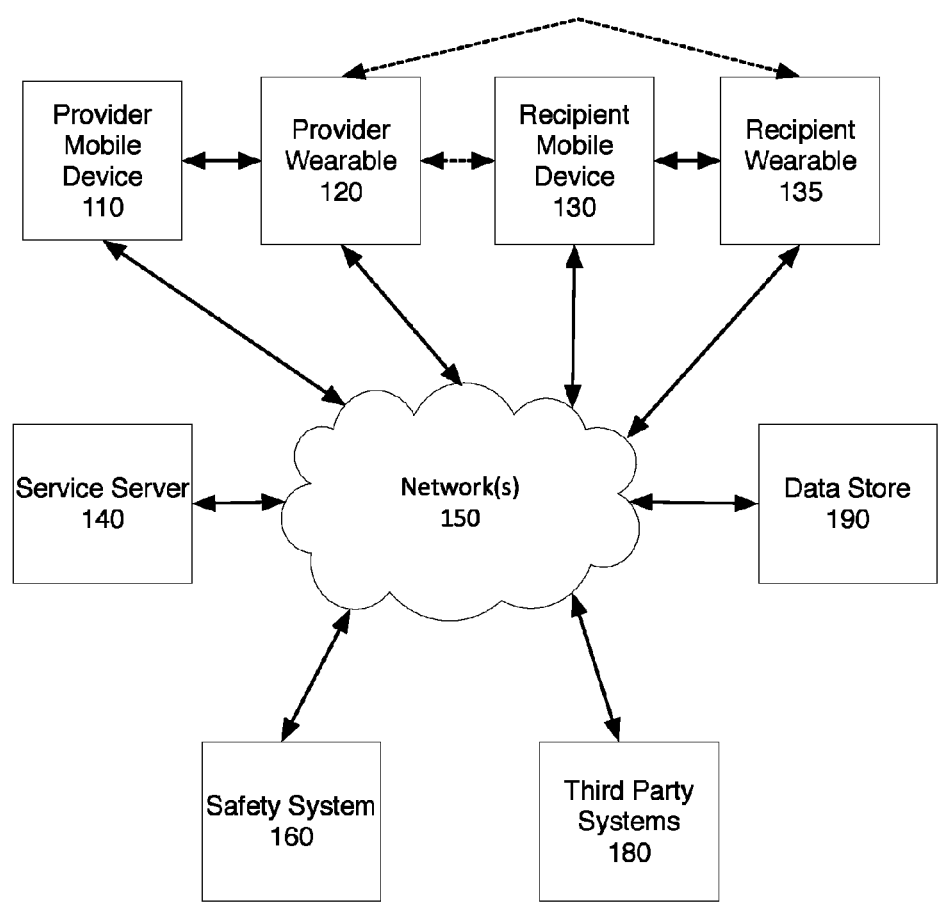
FIG. 1 is a network diagram showing one embodiment of the elements of the system

FIG. 1 is a network diagram showing one embodiment of the elements of the system. The system includes a mobile device 110 such as a smart phone, and a wearable device 120. The wearable device in one embodiment is a pod, which can be worn as a clip-on, a wrist-band, in the pocket, as a necklace or otherwise on a user's body. The wearable device is designed, in one embodiment, to have a long period between charging, so that the user continues to wear it. In one embodiment, the wearable device is a small self-contained, waterproof pod, which has a battery life of a year using a coin cell battery. The wearable device 120 may have a form factor such as a wristband like the FUEL Band by NIKE or the UP BAND by JAWBONE, or the MOVE Pod by JAWBONE. Other form factors may be used.

The provider wearable 120 interacts with the provider mobile device 110 using a local area network, such as Low Power Bluetooth (BLE), Bluetooth, or a Personal Area Network. The provider wearable 120 in one embodiment further is designed to accept linking inquiries from other parties, such as recipient mobile device 130 and/or recipient wearable 135. Recipient mobile device 130 may be a smart phone, and is designed to identify and link with provider wearable 120. Unlike a direct phone-to-phone/mobile-to-mobile connection, a connection between the wearable 120 and the recipient mobile device 130 does not impact the security of the data on the provider's mobile device 110 or the recipient's mobile device 130. However, the link can provide authentication and validation data to both mobile devices 110, 130.

In one embodiment both the provider mobile device 110 and the recipient mobile device 130 interact with service server 140. In one embodiment, service server 140 enables the provision of the service between provider and recipient. For example, if the provider is a driver and the recipient a passenger, then the server 140 provides the interface enabling the passenger to schedule a pick-up by a driver. In one embodiment, both provider mobile device 110 and recipient mobile device 130 interact with service server 140 through an application. This application enables them to schedule the service/interact. Alternatively, a browser or similar tool may be used. Service server 140 may provide services to negotiate the transaction, or may simply provide a place where a provider may offer a service, or a recipient may request a service.

Safety system 160 in one embodiment can be contacted by provider mobile device 110 and/or recipient mobile device 130, when detecting a potentially dangerous situation. In one embodiment, safety system 160 receives a coded message, and notifies the service and optionally third party systems 180 such as law enforcement. In one embodiment, the coded message is sent through mobile device 110/130. In one embodiment, the coded message is originated by a wearable device 120/135, and transmitted via network 150 to safety system 160.

In one embodiment, transaction data and user data is stored in a data store 190 which may be part of the server 140. In one embodiment, service server 140, safety system 160, and data store 190 may be on a single server device or server system. In one embodiment, any of the elements may be implemented in a distributed manner, using for example a cloud-based service. Though the term "server" or "store" is used, this does not mean that a single computer acts a server, but rather it means that a device or set of devices or systems provide a server-utility.

Figure 2A:
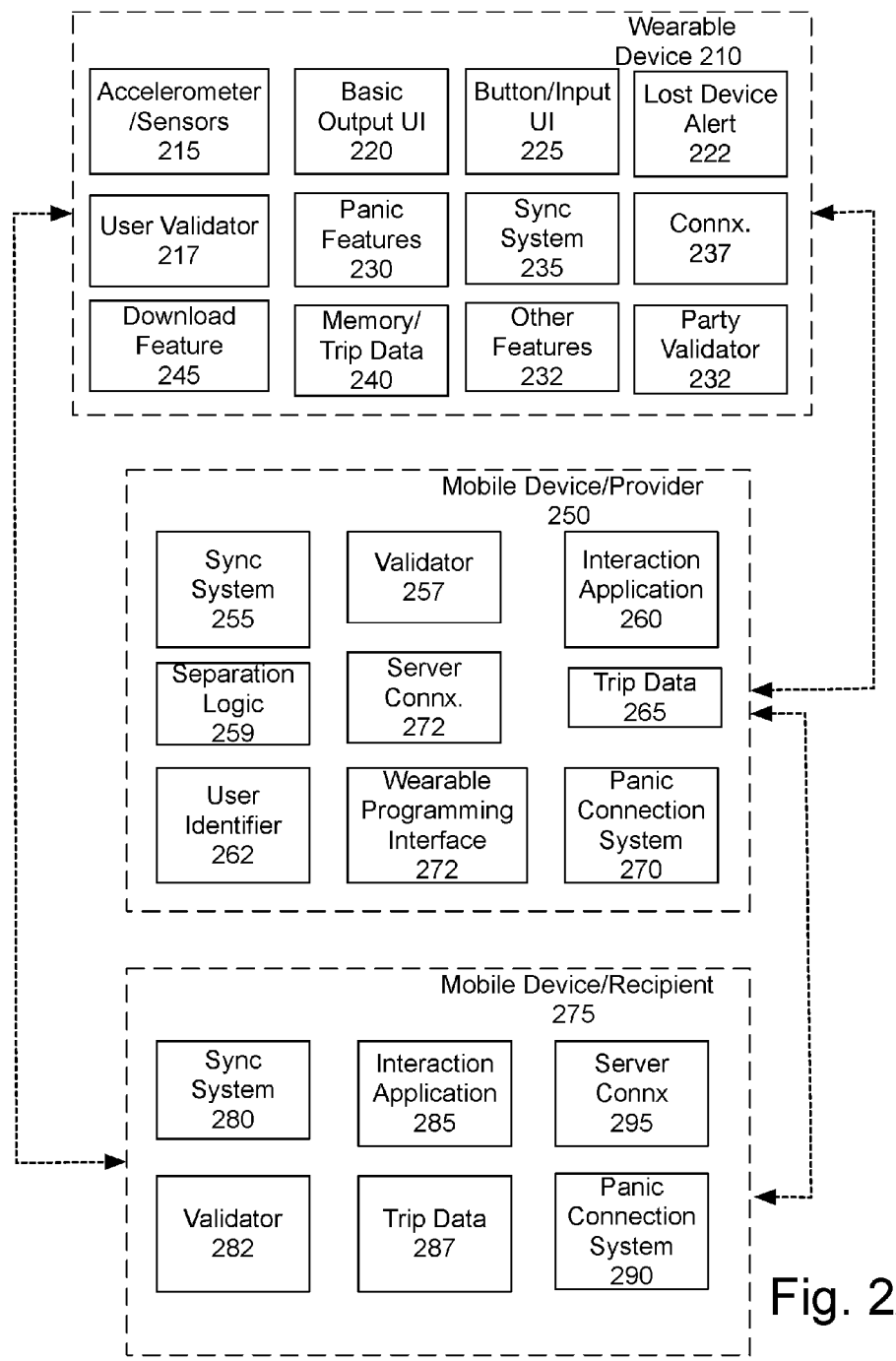
FIG. 2A is a block diagram of one embodiment of the various elements of a system.

FIG. 2A is a block diagram of one embodiment of the various elements of a system. A wearable device 210 interacts with mobile devices including provider mobile device 250 and recipient mobile device 275. In one embodiment, the wearable device 210 may be a special purpose wearable device for security and authentication, as described. In one embodiment, wearable device 210 may be a general utility wearable device, such as a JAWBONE MOVE, which has as an additional feature such the validation and security features described here.

In that embodiment, the wearable device 210 may provide other features 232, such as step counting, sleep tracking, and/or monitoring the user's health or activity. In one embodiment, if either the mobile device 250, 275 or wearable device 210 include accelerometers and the capability of monitoring the user, in one embodiment, the movement data may be used by a validator to validate that the current wearer of the wearable device 210 is the registered user.

Wearable device 210 includes in one embodiment accelerometer 215. In one embodiment, the device 210 may include instead, or additionally, other sensors 215, such as gyroscopes, barometers, magnetometers, temperature sensors, etc.

In one embodiment, the wearable device includes a basing output UI 220. The basic output UI 220 may be an LED, a speaker, a vibration motor, an LED screen, or any other method of providing data to the user on the wearable device 210. In one embodiment, the basic output UI is vibration motor and a plurality of LEDs. The wearable device 210 also includes a basic input UI 225. In one embodiment, the input UI 225 may be a button, or plurality of buttons, the accelerometer 215 to enable gesture or motion UI, a touch screen, keyboard, or other mechanism of enabling a user to interact with the wearable device 210. The basic output 220 and input 225 in one embodiment are supplemented by the associated mobile device 250/275 which provides a richer UI experience for the user.

In one embodiment, the wearable device 210 includes a connection system 237 which establishes and maintains a connection between the wearable device 210 and the mobile device 250/275 of the registered user. In one embodiment, synchronization system 235 which synchronizes data collected by the device 210 with the associated mobile device 250/275.

In one embodiment, the wearable device 210 includes on-board memory to store trip data 240 and other data, which may be used as a backup for the mobile device 250/275. The wearable device 210 may further include a download feature 245.

Wearable device 210 in one embodiment includes panic features 230 which enable a user to trigger an alert via input UI 225. Panic features, in one embodiment, are defined by the user, and may involve calling law enforcement or the service, both, or another designated party.

In one embodiment, wearable device 210 further includes Party validator, which enables the wearable device to interact with the mobile device 250/275 of the other party to enable validation of the user. This will be described in more detail below.

In one embodiment, wearable device 210 may further include user validator 217, which validates the wearer of the device 210 using accelerometer or other sensor 215 data. The movement of individuals is characteristic, and while identifying the particular user may not be possible, ruling out the user is relatively easy based on data in memory 240 compared to sensor data. If the user validation fails 217 the system may trigger a validation in mobile device 250. Such validation may include entering another password or biometric, or validating identity in some other way.

In one embodiment, wearable device 210 includes lost device alert 222 which lets the user know when the mobile device 250/275 and the associated wearable device 210 are out of range from each other.

The wearable device 210 is paired with a mobile device, in this case shown as device 250, of the provider. In one embodiment, the features described with respect to mobile device 250 may also be present on mobile device 275, associated with recipient. In one embodiment, the features may be provided by an application, or a plurality of applications.

The mobile device 250 includes a sync system 255 that synchronizes the mobile device 250 and associated wearable device 210. In one embodiment, synchronization may include establishing a connection, sharing data, and updating memory.

In one embodiment, the mobile device 250 includes an interaction application 260, such as a taxi application, or buying/selling application. In one embodiment, the elements described, or portions of them, may be within the application 260. The application enables setting up an interaction, such as a purchase, a trip with a car hailing service, or another kind of transaction that is set up remotely but completed in person.

Server connection 272 is used by the application 260 to set up transactions, obtain data about the other party, and complete transactions.

Validator 257 validates the identity of the other party in the transaction/interaction, based on data from the server. In one embodiment, validator 257 receives data via wearable device 210 which provides a layer of security between the mobile devices 250/275, ensuring that if one device is compromised the transaction doesn't provide access to the other device.

Separation logic 259 utilizes the connection to wearable device 210 to alert if the two devices become separated. In one embodiment, the separation logic 259 triggers an alert on the mobile device 250, while lost device alert 222 triggers the alert on the wearable device 210.

Trip data 265 is stored on mobile device 250 as well as server. This data may be used in a panic situation, to provide data to the service and/or law enforcement. It may also be used in billing and other interactions. In one embodiment, trip data 265 may also provide data about the drive, if the interaction is a taxi or ride sharing application.

In one embodiment, user identifier 262 either utilizes sensors in mobile device 250 (not shown, but likely present and includes compass, accelerometer, gyroscope, magnetometer, barometer, and optionally others) or data received from wearable device 210 sensors 215, to identify the registered user as the current wearer of the wearable device 210. As noted above, if the identification fails, the system may require other validation.

Panic connection system 270 in one embodiment, enables the connection to the service or law enforcement, if the user triggers a panic alert on the wearable device 210. In one embodiment, the connection may establish a connection to the service, continuously transmitting data until actively disabled by the user. In one embodiment, disabling this feature may require authentication, to ensure that a bad actor cannot disable it. In one embodiment, the system may provide a "false disable" option, in case the user is under duress and must create the appearance of disabling the panic alert, without actually doing so.

Although not show, mobile device 250 of course includes user interface features, which provide input and output features. Wearable programming interface 272 enables the user to utilize the mobile device 250 to set preferences for the wearable device 210.

Mobile device 275 shows the portions of the application for the party who is not wearing a wearable device 210. Of course, in one embodiment, the system may include both the features shown associated with mobile device 250 and the features shown in connection with mobile device 275.

Sync system 280 synchronizes the mobile device 275 with a server (not shown), via server connection 295. Interaction application 285 enables the user to engage in a transaction, such as hailing a ride, purchasing or selling something, etc.

Validator 282 validates the identity of the other party to the transaction via a connection between mobile device 275 and wearable device 210. One embodiment of that process is described in more detail below. Trip data 287 stores information about this trip, as backup, and for billing purposes. In one embodiment, trip data may be used to validate the route being taken by the driver. Panic connection system 290 in one embodiment enables the system to provide an automatic panic alert, when the validation fails, and the drive or other party in the transaction does not appear to be the party previously contracted.

Of course, while the above block diagrams are described as separate blocks, as a general matter the hardware elements include user interface features, one or more processors, and memory, as well as one or more network connections. While the various elements were described as residing in different elements of the system, they may be collocated on a single hardware.

Figure 2B:
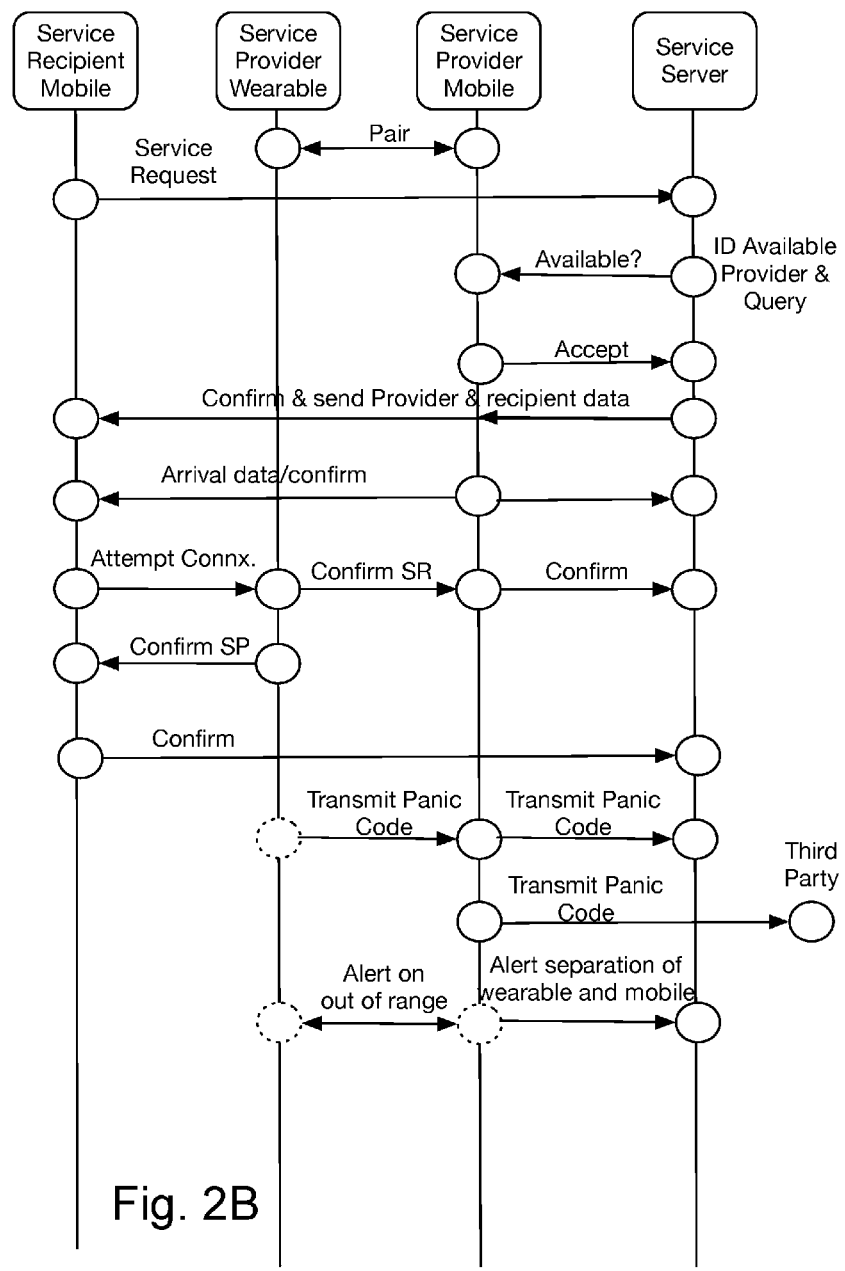
FIG. 2B is an exemplary signal diagram showing the interactions between the elements of the system.

FIG. 2B illustrates an exemplary signal flow between the service recipient's mobile device, the service provider's wearable device, the service provider's mobile device, and the service server. Although the system illustrated only shows a wearable device associated with the service provider, it should be understood that the service recipient may additionally, or alternately, have a wearable device. The functionality of such wearable devices would be understood by one of skill in the art.

The circles indicated as dashed, e.g. transmit panic code and alert on out of range, indicate that these signal transmittals only occur when needed, e.g. when there is a cause for panic or a separation of the wearable device and the paired mobile device. In one embodiment, the separation is identified when the connection between the wearable and the mobile device is interrupted, and cannot be recovered after multiple attempts. In one embodiment, the panic code is transmitted when the wearer of the wearable device presses a panic code. In one embodiment, there may be a single panic code. In one embodiment, there may be multiple codes, associated with different circumstances. For example, there may be a separate code for an armed person than for a drunk/throwing up person, but both alerts can be made available.

Initially, the mobile device and wearable are paired.

The service recipient initiates a service request, with server. The service request may be a "I need a ride from location X to location Y" or "I want to sell object X."

The server identifies a potential provider, and queries the provider about availability. If the provider accepts, the process continues. If the provider declines, the server submits the request to another potential provider.

After the provider accepts, the server sends the full request to the provider, and the provider information to the original requester.

The provider sends confirmation to the server and the recipient, as well. In one embodiment, the confirmation includes an estimated time for the transaction.

At this point, the recipient's system waits for the transaction to be initiated in person. Once the provider arrives, and the in-person portion of the transaction starts, the recipient attempts to connect to the provider's wearable device. If the connection is successful, the wearable confirms, via the provider's mobile to the server that connection has been made. The wearable then confirms the identity of the provider to the recipient. Confirmation is also obtained from server.

Optionally there may be a panic code transmitted from provider wearable, if triggered by the provider. The panic code is transmitted from the wearable, to the mobile device, to the server, and optionally to third parties.

In one embodiment, optionally there may be an alert if the wearable is out of range of the mobile device. In one embodiment, if the alert is not released, the server may be informed that the devices are separated. In one embodiment, the user would need to re-validate with the system in order to use it, before the system would permit further interactions. This is to provide additional security in transactions between parties that do not know each other, but meet in person to complete the transaction.

Figure 3:
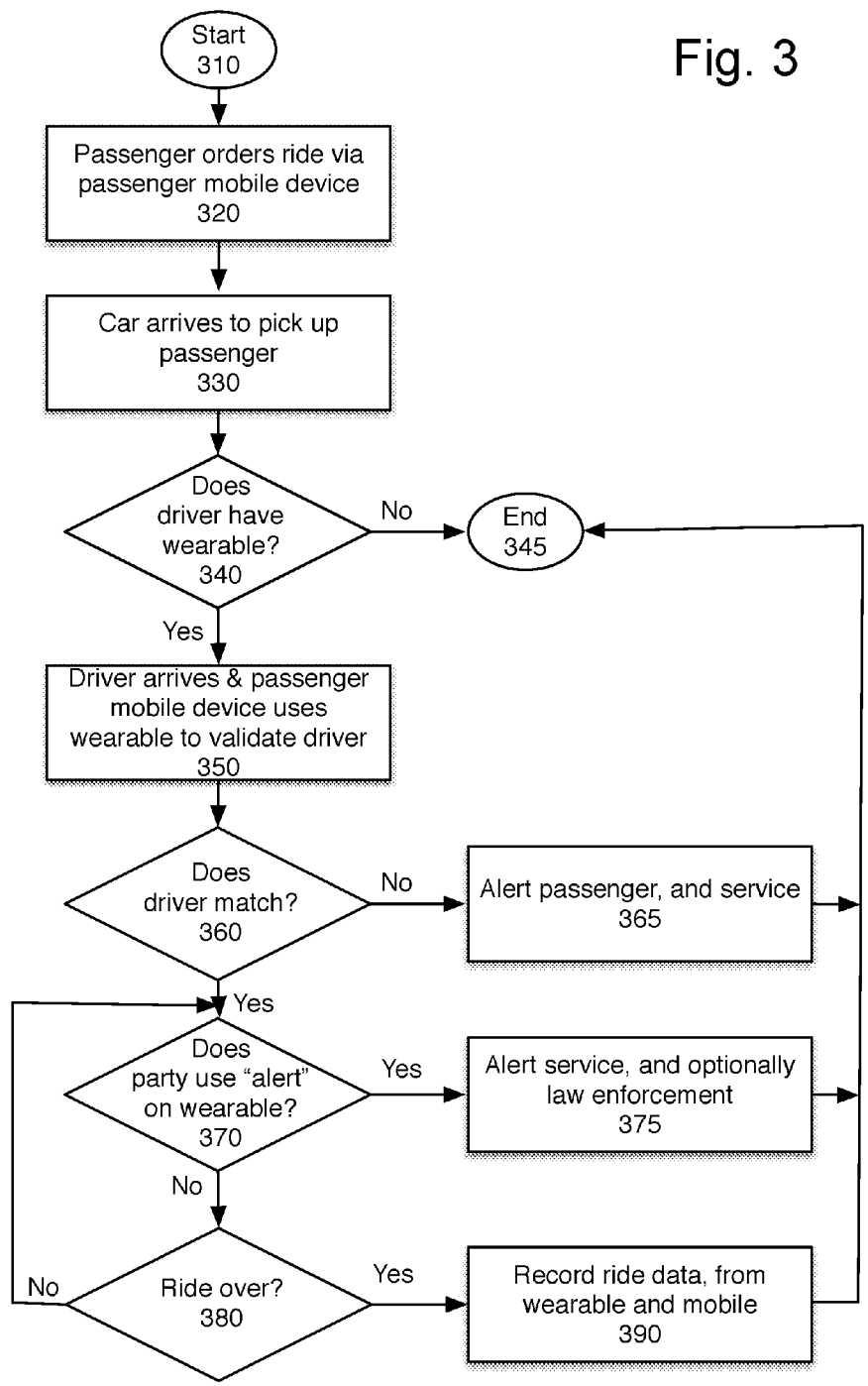
FIG. 3 is an overview flowchart of one embodiment of using the system.

FIG. 3 is an overview flowchart of one embodiment of using the system, in a ride provision context. It should be understood that the process would be similar in a context where another service was provided, such as valet service, shopping, buying/selling items, house cleaning, etc. The process starts at block 310. In one embodiment, a passenger orders a ride via a passenger mobile device. In one embodiment, this may be done using an application on the passenger mobile device.

At block 330, a car arrives to pick up the passenger. In one embodiment, when the passenger requests the ride, the ride server identifies a driver that is in the area and available to pick up the passenger. The driver is then notified of the request, including the passenger, destination, and the location of the pick-up. The driver may accept the request. Once the driver accepts the request, in one embodiment, the passenger is notified of the driver, and the estimated arrival time. In one embodiment, additional data about the driver is provided, such as the vehicle make and model & the driver's name.

At block 340, the process determines whether the driver has a wearable. If not, the process ends at block 345.

If the driver does have a wearable—in one embodiment, this information is provided to the passenger by the system—the process continues to block 350. In one embodiment, the passenger's request may indicate that he or she would only accept a driver who has the wearable.

The driver arrives at the pick-up location, and the passenger's mobile device connects to the wearable, at block 350.

Part of the validation includes verifying that the wearable is associated with the mobile device of the driver whose data was provided to the passenger. This is done transparently to the user, by automatically discovering the wearable via Bluetooth or other personal area network, and exchanging the identifying data, and comparing that data to the information about the driver that was received by the passenger from the server, at the time of booking.

At block 360, the process determines whether the driver matches the identified driver. If not, at block 365, the passenger and service are alerted. In one embodiment, the user may be alerted via a visual or audio feedback not to enter into the vehicle. In one embodiment, the data exchange and authentication takes place fast enough that the driver can be validated, or identified as being fake, between when the vehicle pulls up and the passenger gets into the car. The process then ends.

If the driver is successfully matched, the process continues to block 370. At this point, the passenger can get in, and assume that the trip is a safe one.

At block 370 the process determines whether a party has used an "alert" or "panic" function on the wearable device. Because the mobile device is generally in a holder visible to the passenger—due to hands free laws, it cannot be carried—it is useful to provide an unobtrusive mechanism for the driver to indicate a problem, a mechanism that a passenger would likely not be able to observe. For example, the panic function may be a particular sequence of movements, or taps, repeated, if the wearable has an accelerometer. In one embodiment, the panic function is designed not to be similar to any accidental motions. Alternatively, the panic alert may be pushing a panic button, or buttons, to trigger an alert. In one embodiment, either the driver or a passenger who has a wearable may trigger the alert. In one embodiment, there may be multiple potential alerts, depending on the scenario, e.g. violent v. drunk v. thieving passengers may have different associated "alert" codes. Similarly, a passenger may alert the system if the driver is taking them on a long route, instead of directly, as well as violence, drug or alcohol based impairment, etc.

If a party uses the alert, at block 375, the service and optionally law enforcement is notified. In one embodiment, the alert includes the current location of the driver's mobile device, and continues to transmit the location of the mobile device & when available the wearable device. This data may be transmitted to law enforcement, enabling them to easily catch up with the vehicle. The process ends at block 345. In one embodiment, the process ends when either the driver terminates the alert, or the interaction between the driver and passenger ends, whether via law enforcement or otherwise.

If neither party uses the alert functionality, at block 380 the process determines whether the ride is over. If not, the process continues to monitor for the use of the panic button. When the ride is over, the ride data is recorded, in one embodiment from the wearable and the mobile device, at block 390. In one embodiment, the wearable device provides a backup of ride data, in case the driver loses the mobile device, or it is stolen. The process then ends.

Figure 4:
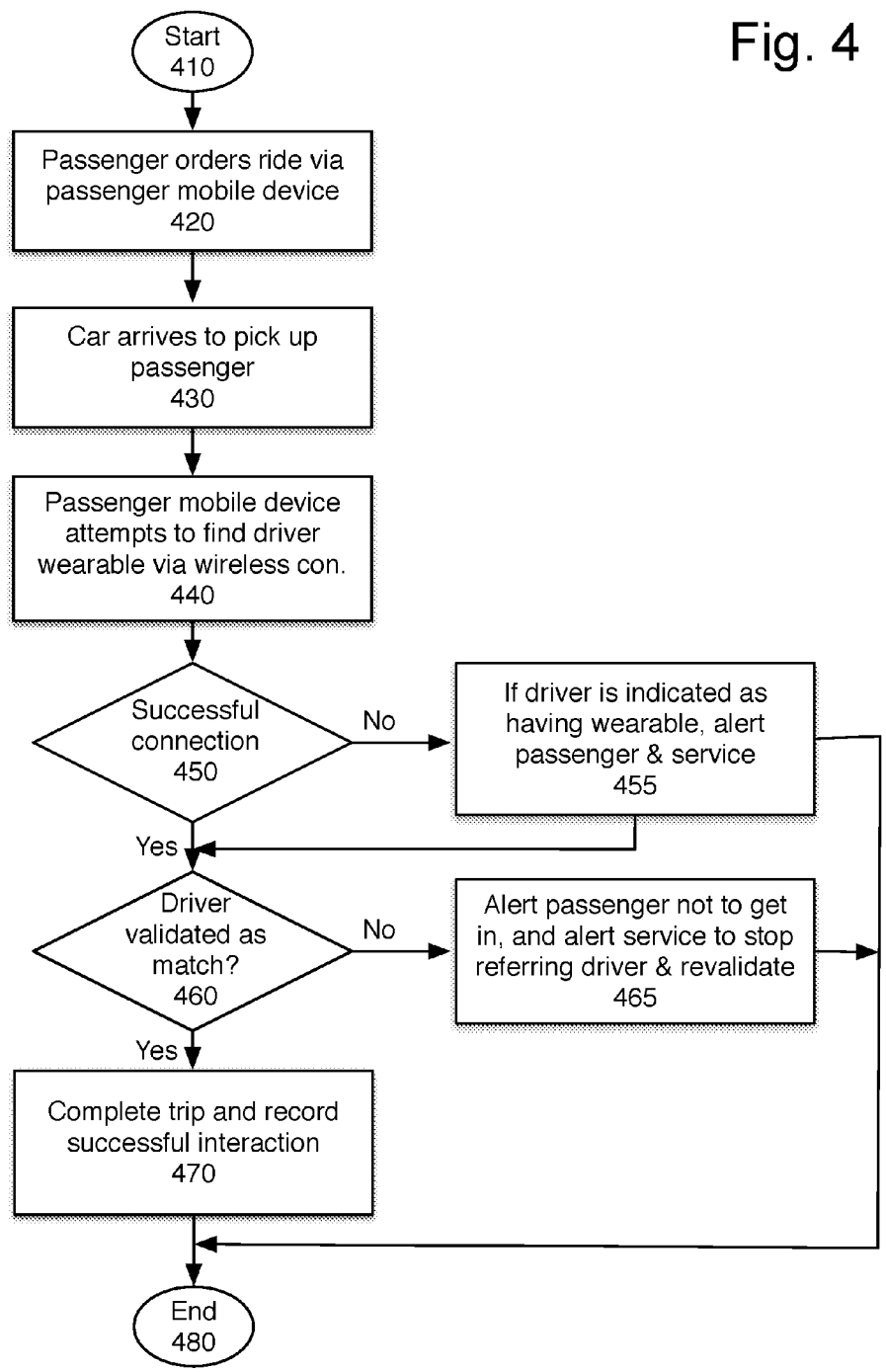
FIG. 4 is a flowchart of one embodiment of using the system as a passenger/service recipient.

FIG. 4 is a flowchart of one embodiment of using the system as a passenger/service recipient. As above, the example uses a passenger, but it would be easy to see for one of skill in the art how each of the process elements would be applied to another setting. The process starts at block 410.

At block 420, the passenger orders the ride. This may be done via the passenger's mobile device. It may be done for "now" using the passenger's current location as the originating point, or may be done for the future, designating an origination & destination location. In one embodiment, the user may specify that he or she wishes to use someone who has the wearable device, for security. In one embodiment, passengers may set a preference globally or per ride, or may provide a preference or premium for drivers who have the wearable device.

At block 430, a car arrives to pick up the passenger. As soon as the car arrives, at block 440 the passenger mobile device attempts to connect to the driver's wearable device via a wireless connection.

If the system cannot establish a connection, as determined at block 450, and the driver is indicated as having a wearable, the passenger is alerted, at block 455. Because such a connection can be established quickly, the passenger should receive an indication that a valid match has been made prior to entering the vehicle.

If the connection is established, the system attempts to validate the driver, as the person who was contacted and accepted the contract for this service. If this not successful, at block 465 the passenger is alerted. In one embodiment, the passenger may then request an alternate form of identification, such as a driver's license, or access to the driver's application.

In one embodiment, in such a case the service is also notified that the validation failed. This may occur because the driver who arrived was not the one who initially accepted the service, for any one of a number of reasons. It may also be because the wearable fails, though that is a negligible risk. In one embodiment, the driver is prompted to get a replacement wearable if validation fails. In one embodiment, the driver's own system attempts to validate through the wearable, and if that also fails the driver may be recalled/not scheduled for further jobs until a new wearable can be issued or purchased.

If the trip is completed & validated, the successful interaction is recorded. In one embodiment, the system automatically suggest an additional tip or positive review for the wearable-wearing driver. The process en ends at block 480, after the user has paid the fare and completed the transaction.

Figure 5:
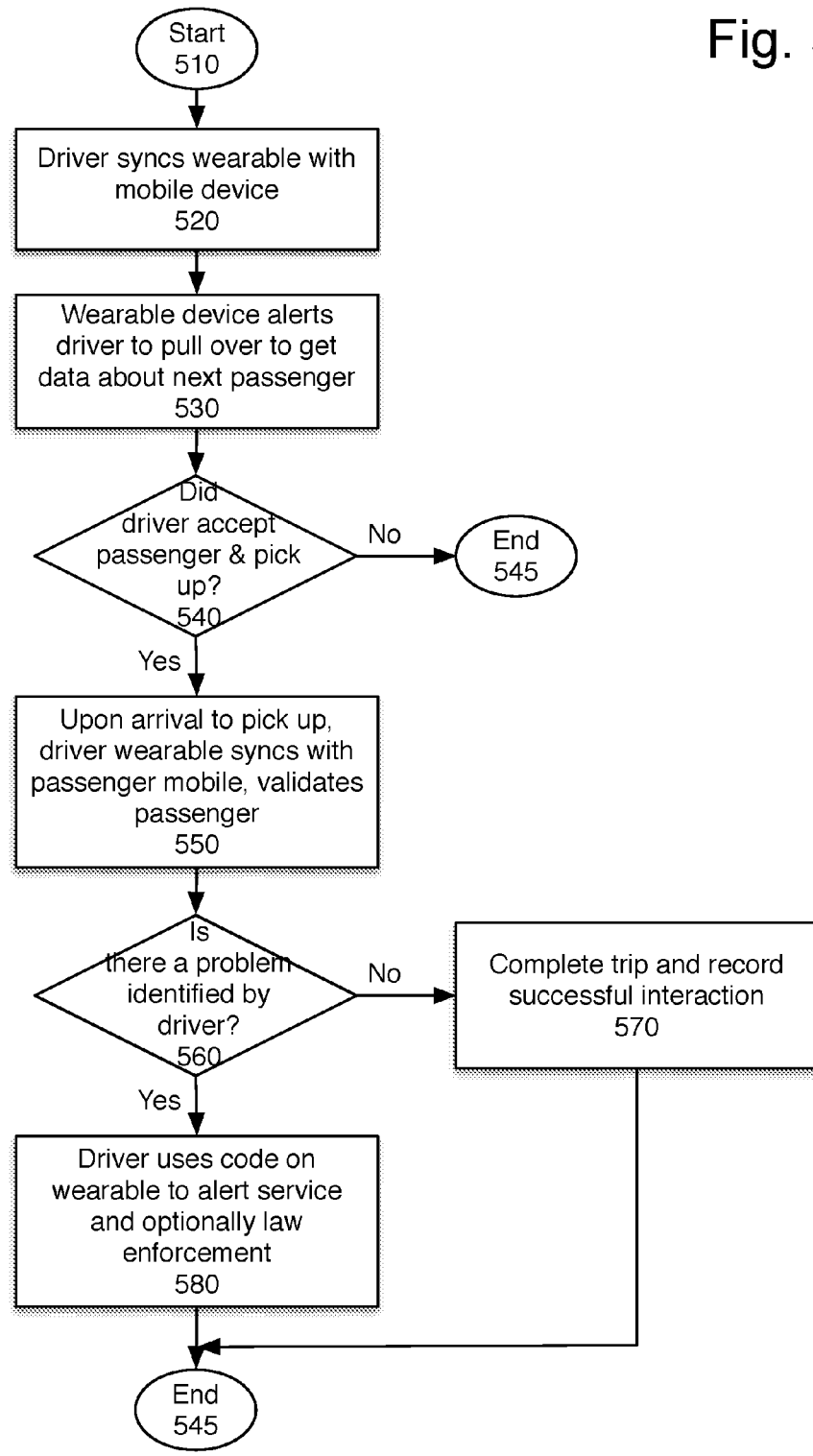
FIG. 5 is a flowchart of one embodiment of using the system as a driver/service provider.

FIG. 5 is a flowchart of one embodiment of using the system as a driver/service provider. When the driver starts using the wearable, he or she synchronizes the wearable data with the mobile device, at block 520. In one embodiment, this may involve registering the wearable with the server and the application. Once such a connection is established, it is maintained when the two devices in range. In one embodiment, low power Bluetooth (BLE) is used to maintain the connection.

At block 530, in one embodiment, the wearable device alerts the driver to pull over to get data about the next possible passenger/customer This enables the driver to pull over instead of reading the data on the mobile device while driving, which can be dangerous.

At block 540, the process determines whether the driver accepted the passenger and pick-up, in one embodiment. In one embodiment, the system offers potential passengers to the driver, showing the pick-up location and the drop-off location. In one embodiment, it also shows timing, and traffic, and proposed payment. The driver may choose to accept, or reject, the job. If the driver chooses not to accept, the process ends 545. Of course, when the next potential passenger's data is sent to the driver, the process continues to block 530, to make the next offer to the driver.

If the driver accepts the passenger, when the driver arrives at the pick-up location, the driver wearable connects with the passenger mobile device or wearable, and validates the passenger as the person who called the ride. It also validates the driver as the person who agreed to provide the ride, for the passenger's benefit. If the wearable fails to validate, indicating that the passenger is not who he or she claims to be, the driver has the opportunity to drive away. Again, in one embodiment, the fast connection and data exchange, without direct connection between mobile devices provides additional safety to the individuals, while providing device protection.

In one embodiment, during the driver, the driver may utilize the alert system to indicate that there is a problem.

At block 560, the process determines whether there is a problem identified by the driver. If there is no problem, the trip is completed at block 570, and it is recorded.

If there is a problem, the process continues to block 580. The driver uses a code on the wearable—unobtrusive and not visible to the passenger. In one embodiment, there may only be a single code, e.g. "there is a problem." In another embodiment, there may be different codes for different problems. A problem may be anything that may trigger a need to unobtrusively notify someone. FIG. 6 illustrates some exemplary situations that may be identified as problems, e.g. an armed passenger, a carjacking, an ill passenger, a violent passenger, etc. FIG. 6 also shows some exemplary "codes" which in one embodiment may involve pushing a button, or buttons. In one embodiment, the codes may be tapping in a pattern on the wearable. In one embodiment, the codes may be squeezing the wearable, or in some other way indicated using the wearable, and sensors in the wearable, to send an alert.

In one embodiment the system, server, or driver can define codes that may be available. In one embodiment, each code has a corresponding action, which may range from providing automatic guidance to the nearest hospital or police station, to sending out a 911-type alert that the driver's life is in danger. In one embodiment, the codes and actions may both be defined. In one embodiment, the default is to provide a simple emergency code which contacts law enforcement, and provides the driver's location and destination to law enforcement. In one embodiment, once a problem code is entered, the system may provide continuous updates to law enforcement and/or the service. Such updates may include the current location and speed of the vehicle.

The process then ends at block 545. In one embodiment, if a problem alert is correctly triggered, the passenger may be blacklisted from the service.

Figure 7:
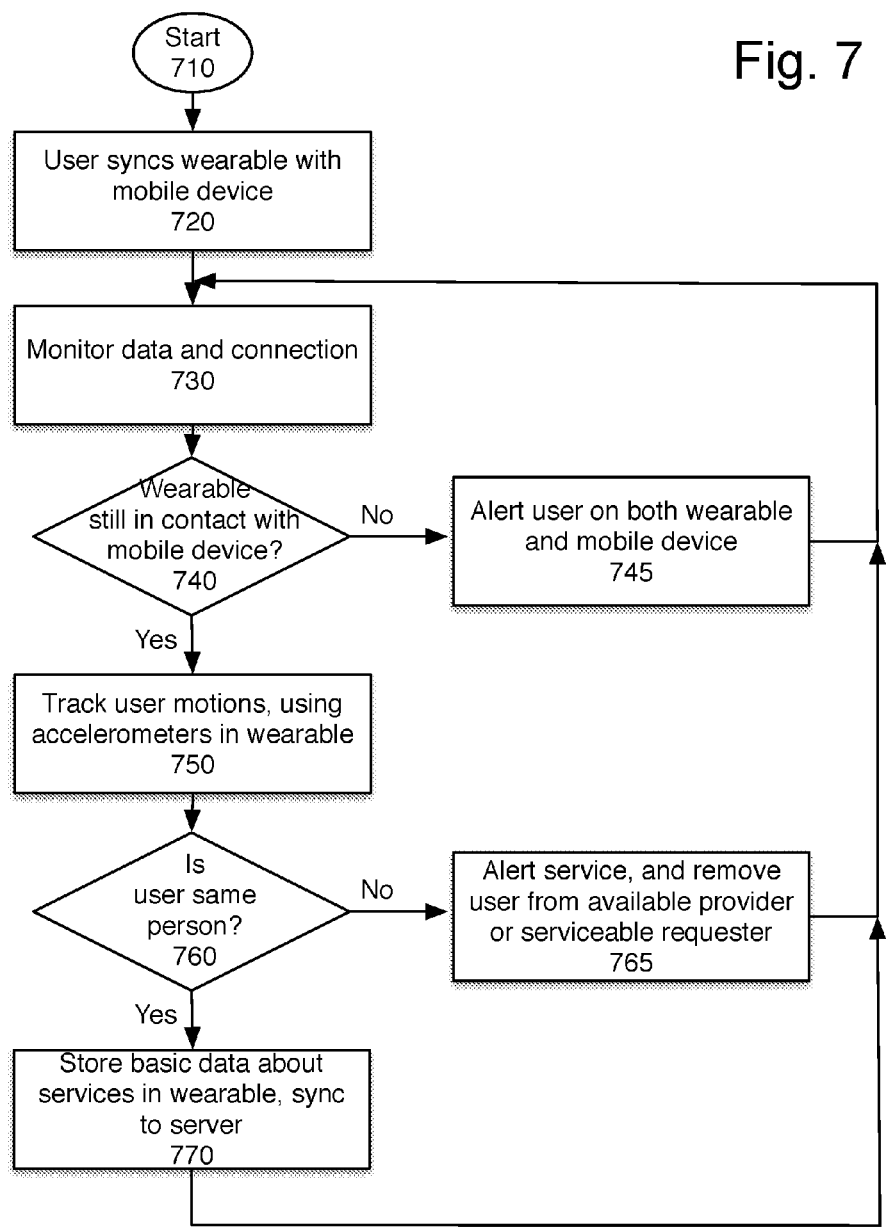
FIG. 7 is a flowchart of one embodiment of verifying user identity with the wearable device.

FIG. 7 is a flowchart of one embodiment of verifying user identity with the wearable device. This may be applicable to both driver and passenger in the example above.

At block 720, the user synchronizes the wearable device with a mobile device. This sets up a connection between the wearable device and the mobile device, that is period or continuous but verifies the connection on a regular basis. In one embodiment, the connection may be a BLE (Low Power Bluetooth) connection. Other local area or personal area network connections may be used.

At block 730, the data and connection are monitored. In one embodiment, this includes sending a periodic ping. In one embodiment, sensors monitor the device's movements, and the periodicity of the ping may be adjusted based on whether the device is moving. In one embodiment, when the device is not moving, the pings may occur every few seconds, whereas when one or both of the devices are moving, the pings may be more frequent.

At block 740, the process determines whether the wearable is still in contact with the mobile device. In one embodiment, a low power BLUETOOTH or other personal area network is used to link the wearable device and the mobile device. Thus, when the device is out of range (which may be 5-10 feet, in one embodiment), the connection is lost. At that point, in one embodiment, the user is alerted on both the wearable and mobile device. This enables the user to become aware if he or she loses the wearable device or the mobile device, or if one or the other of the devices is stolen. In one embodiment, the mobile device may provide information about the last location of the wearable device, just before connection was lost. This makes it easier for the user to find the device. The process then continues to block 730 to continue monitoring.

If the wearable device is in contact with the mobile device, the process continues to block 750.

At block 750, in one embodiment, the user's motions are tracked using accelerometers in the wearable device. As noted above, in one embodiment, the wearable device is a personal monitoring device, which provides the user data about activity, and optionally sleep levels. If that is the case, the wearable device has the capability of identifying steps and movements based on data from one or more sensors, such as accelerometers and/or gyroscopes. The walk and body movements of individuals are recognizable are characteristic of the particular user. For example, a user generally walks in the same manner, adjusted to the speed of walking.

The system can, after some use, generally determine if the current wearer of the device cannot be not the registered user, based on the differences in movement, such as step cadence and length, sway, and other factors. In another embodiment, if the wearable device does not have this capability, the process loops back to block 730 from block 740/745, to continue monitoring.

At block 760, the process determines if the current wearer of the device is the registered user. If not, the service is alerted. In one embodiment, the user is removed from the pool of available service providers, and/or the pool of eligible service recipients, until the system can revalidate the user. The process then returns to continue monitoring.

If the user is the same person, at block 770 basic data about the service provided is stored in the wearable device. This data is available to be synchronized to the server, via the mobile device or another computing system. This provides a backup of services, in case the mobile device is lost or the server is hacked. The process then returns to block 730 to continue monitoring.

Of course, though various figures in this application are shown as flowcharts, it should be understood that any of the processes described could be implemented out of order, based on an interrupt driven system, or skipping one or more of the process blocks shown in the embodiment in the figures.

Figure 8:
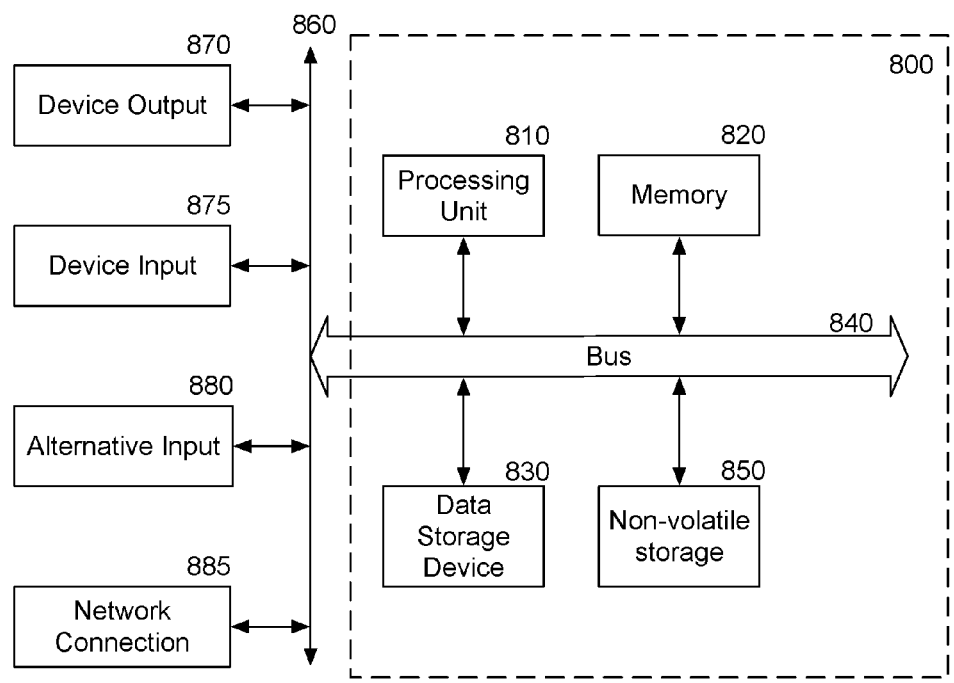
FIG. 8 is a block diagram of one embodiment of a computer system that may be used with the present invention.

FIG. 8 is a block diagram of one embodiment of a computer system that may be used with the present invention. It will be apparent to those of ordinary skill in the art, however that other alternative systems of various system architectures may also be used.

The data processing system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), or another type of processing unit 810.

The system further includes, in one embodiment, a random access memory (RAM) or other volatile storage device 820 (referred to as memory), coupled to bus 840 for storing information and instructions to be executed by processor 810. Main memory 820 may also be used for storing temporary variables or other intermediate information during execution of instructions by processing unit 810.

The system also comprises in one embodiment a read only memory (ROM) 850 and/or static storage device 850 coupled to bus 840 for storing static information and instructions for processor 810. In one embodiment, the system also includes a data storage device 830 such as a magnetic disk or optical disk and its corresponding disk drive, or Flash memory or other storage which is capable of storing data when no power is supplied to the system. Data storage device 830 in one embodiment is coupled to bus 840 for storing information and instructions.

The system may further be coupled to an output device 870, such as a cathode ray tube (CRT) or a liquid crystal display (LCD) coupled to bus 840 through bus 860 for outputting information. The output device 870 may be a visual output device, an audio output device, and/or tactile output device (e.g. vibrations, etc.)

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network or other method of accessing other devices. The communication device 885 may further be a null-modem connection, or any other mechanism that provides connectivity between the computer system 800 and the outside world.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a handheld or portable device containing a subset of the computer hardware components described above. For example, the handheld device may be configured to contain only the bus 840, the processor 810, and memory 850 and/or 820.

The handheld device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 810, a data storage device 830, a bus 840, and memory 820, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 810. A machine-readable medium includes any non-volatile mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of providing an additional safety mechanism comprising:
    enabling a setting up of a transaction between a recipient and a provider using a recipient mobile device at a first time, the transaction to be completed at a later time in-person by the recipient and the provider;
    providing a wearable device, designed to connect to the recipient mobile device and a provider mobile device, the wearable device used to identify an owner of the wearable device as the provider; and
    the connection between the wearable device and the recipient mobile device providing an authentication of the recipient to the provider, wherein when the transaction is a taxi service, the authentication occurs before the recipient enters a vehicle.

2. The method of claim 1, further comprising:
    utilizing a server to set up the transaction, the server validating the recipient and the provider.

3. The method of claim 1, wherein the authentication occurs prior to the in-person engagement between the recipient and the provider.

4. The method of claim 1, further comprising:
    receiving a panic indication on the wearable device; and
    alerting a designated contact, utilizing the provider mobile device.

5. The method of claim 4, wherein the panic indication comprises one of a plurality of panic indications, and the designated contact is one or more of a service and law enforcement.

6. The method of claim 4, wherein the panic indication is an unobtrusive interaction with the wearable device.

7. The method of claim 1, further comprising:
    validating a registered user based on data from sensors in the wearable device, the validation confirming an identity of the registered user.

8. The method of claim 7, further comprising:
    sending an alarm when the authentication using the wearable device fails, and requiring the registered user to validate through a server.

9. A transaction validation system comprising:
    a wearable device including a sensor to be worn by a user;
    a user mobile device including a processor and memory, the user mobile device including:
        a synchronization system to set up a connection between the wearable device and the user mobile device;
        an application to enable setting up a transaction between the user and an other party, the transaction to be completed in-person;
    during the in-person engagement between the user and a person, the wearable device to connect to the person's mobile device when the user meets the person, a party validator in the wearable device used to authenticate the person as the other party to the transaction, wherein when the transaction is a taxi service, the authentication occurs before the other party enters a vehicle of the user.

10. The transaction validation system of claim 9, further comprising:
    a server to set up the transaction, the server validating the user and the other party.

11. The transaction validation system of claim 9, wherein the authentication occurs prior to the in-person engagement between the user and the other party.

12. The transaction validation system of claim 9, further comprising:
    a panic feature on the wearable device for receiving a panic indication on the wearable device, and alert a designated recipient, utilizing the user's mobile device.

13. The transaction validation system of claim 12, wherein the panic indication comprises one of a plurality of panic indications, and the designated recipient is one or more of the service and law enforcement.

14. The transaction validation system of claim 13, wherein the panic indication is an unobtrusive interaction with the wearable device.

15. The transaction validation system of claim 9, further comprising:
    a validator to validate the user based on data from sensors in the wearable device, the validation confirming an identity of the user.

16. A wearable device worn by a user, to enable a secured transaction between a user having a user mobile device and an other party having a second mobile device, the wearable device comprising:
    a sensor;
    a connection system to set up a connection between the wearable device and the user mobile device;
    a party validator to connect to the second mobile device of a party who indicates they are part of the secured transaction, the party validator used to authenticate the party as the other party to the transactions;
    wherein when the transaction is a transportation service, the authentication occurs before the other party enters a vehicle of the user.

17. The wearable device of claim 16, further comprising:
    wherein the authentication occurs prior to the in-person engagement between the user and the other party.

18. The wearable device of claim 16, further comprising:
    a panic feature to receive a panic indication on the wearable device, and alert a designated recipient, utilizing the user's mobile device.

19. The wearable device of claim 16, further comprising:
    a validator to validate a registered user based on data from sensors in the wearable device, the validator confirming an identity of the registered user.

20. The wearable device of claim 19, further comprising:
    an alarm to trigger when the authentication using the wearable device fails; and
    the validator further to require the registered user to validate through a server.

* * * * *